United States Patent [19]

Holmi et al.

[11] 4,224,850
[45] Sep. 30, 1980

[54] APPARATUS FOR CUTTING A BLANK SHEET INTO STRIPS AND FOR STACKING THE STRIPS IN ADJOINING COMPARTMENTS SEPARATED BY PARTITIONS

[75] Inventors: Ismo V. J. Holmi; Ismo I. Virtanen, both of Pori, Finland

[73] Assignee: Outokumpu Oy, Helsinki, Finland

[21] Appl. No.: 14,430

[22] Filed: Feb. 23, 1979

[30] Foreign Application Priority Data

Feb. 27, 1978 [FI] Finland ................................ 780646

[51] Int. Cl.³ ............................................. B26D 7/18
[52] U.S. Cl. ...................................... 83/105; 83/165; 83/167; 83/430; 83/500
[58] Field of Search ................. 83/102, 104, 105, 165, 83/167, 500, 501, 502, 503, 504, 430

[56] References Cited

U.S. PATENT DOCUMENTS

| | | | |
|---|---|---|---|
| 595,092 | 12/1897 | Bosley | 83/102 |
| 1,866,941 | 7/1932 | Peters | 83/102 X |

*Primary Examiner*—J. M. Meister
*Attorney, Agent, or Firm*—Brooks, Haidt, Haffner & Delahunty

[57] ABSTRACT

An apparatus for cutting a blank sheet into strips and for stacking these strips in adjoining compartments separated by partitions is disclosed, the apparatus having circular blades mounted opposite each other in such a manner that they slightly overlap and are at an interval from each other in the axial direction on at least two shafts which can be rotated in opposite directions and are substantially one above the other, in order to cut the blank sheet fed between the circular blades and to feed the cut strips in the direction of the feed downward onto an inclined slide surface, which has, substantially on the same vertical longitudinal plane as the walls of the said adjacent compartments, guide walls the upper ends of which are preferably beveled and meet the inclined surface in order to receive the cut strips and to guide each of them into its respective compartment, lateral-transfer trays which extend, as seen in the direction of the feed, slightly forward and downward from the circular blades, are also inclined in the lateral direction and extend in the lateral direction from between two adjacent guide walls over one guide wall, at maximum as far as the vertical longitudinal plane running through the cutting point of one edge of the strip entering the lateral-transfer tray and at minimum through the vertical longitudinal plane which passes through the center point between the cutting points of the said strip, in order to slant the cut strips and to cause that edge which is inclined lower to slide along the adjacent guide wall, so that the upper edge can fall between the guide walls before the strip falls into the compartment.

10 Claims, 2 Drawing Figures

APPARATUS FOR CUTTING A BLANK SHEET INTO STRIPS AND FOR STACKING THE STRIPS IN ADJOINING COMPARTMENTS SEPARATED BY PARTITIONS

FIELD OF THE INVENTION

The present invention relates to an apparatus for cutting a blank metal sheet, in particular a thin copper sheet, into parallel adjacent strips and for stacking these strips in adjoining compartments separated by partitions, i.e. in a so-called cassette, from which the strips can be taken individually by, for example, a starting-sheet machine to equip the starting sheets of copper electrolysis with lugs so that the starting sheets can be suspended in the electrolytic tanks and be supported by the lugs and bars passing through the lugs.

There is a previously known apparatus for cutting lug sheets with a circular cutter into parallel adjacent strips which slide along an inclined surface into a cassette provided with partitions, the surface having longitudinal vertical walls for guiding the strips into the compartments separated by partitions in the cassette. Such an apparatus is, however, prone to disturbances. The cut strips tend to turn into a transverse position on top of the guide walls and the adjacent strips and then do not fall into the compartments in the cassette. This disadvantage is largely due to the fact that the edges of the strips, being somewhat uneven after the cutting, tend to cling to each other unless special measures are taken after the cutting to keep the edges of adjacent strips apart. Another cause of disturbances is the fact that the partitions are not longitudinally in alignment with the cutting points, and for this reason the strips have to move in the lateral direction before they can fall into the cassette. There is no gap in the lateral direction between the strips immediately after the cutting, whereas the distance in the lateral direction between the adjacent strips in the cassette is at least equal to the thickness of the partition. This necessitates the movement of the strips between the circular cutter and the cassette in a lateral direction. During this lateral movement the strips often turns into a transverse position and their edges tend to cling to each other.

The object of the present invention is to provide an apparatus, more reliable in operation than previous ones, for cutting a blank sheet into parallel adjacent strips and for directing the strips along an inclined slide surface fitted with longitudinal guide walls into a cassette divided into adjoining compartments by means of partitions.

SUMMARY OF THE INVENTION

According to the present invention there is provided an apparatus for cutting a blank sheet into strips and for stacking these strips in adjoining compartments separated by partitions, the apparatus having lateral-transfer trays which extend, as seen in the direction of the feed, slightly forward and downward from the circular blades, are also inclined in the lateral direction and extend in the lateral direction from between two adjacent guide walls over one guide wall, at maximum as far as the vertical longitudinal plane running through the cutting point of one edge of the strip entering the lateral-transfer tray and at minimum through the vertical longitudinal plane which passes through the center point between the cutting points of the said strip, in order to slant the cut strips and to cause that edge which is inclined lower to slide along the adjacent guide wall, so that the upper edge can fall between the guide walls before the strip falls into the compartment.

DRAWING

PREFERRED EMBODIMENT

Figure 1:
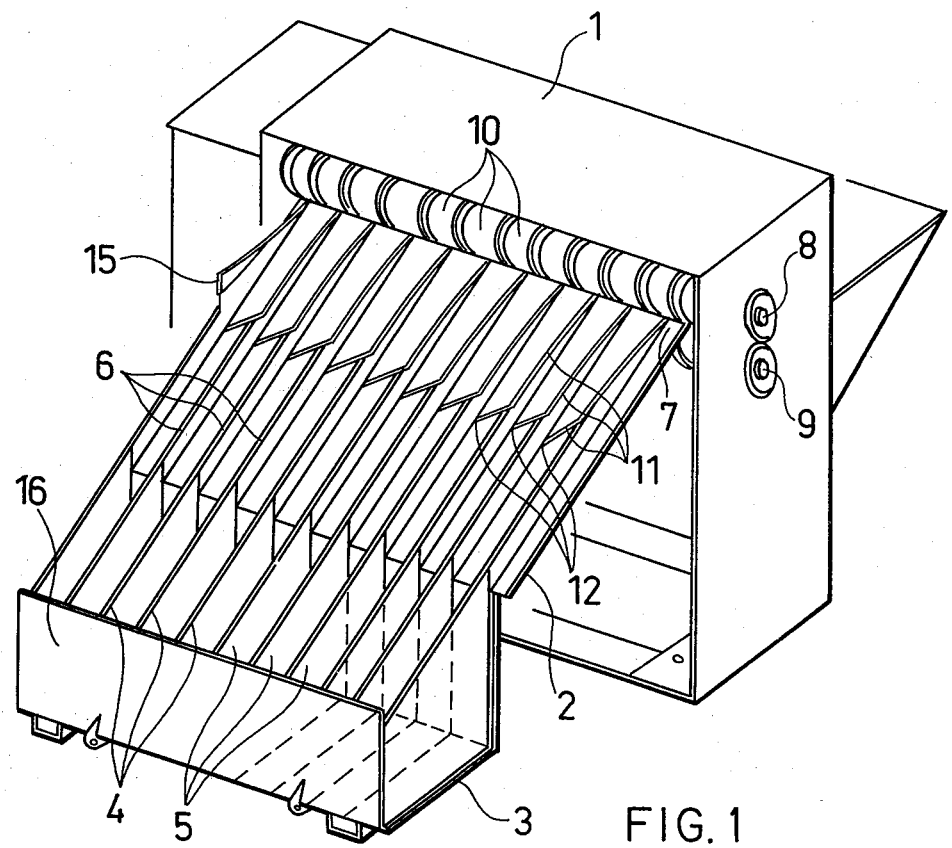
FIG. 1 is a view of a preferred form of the apparatus of the invention in perspective.

In FIG. 1, the complete circular cutter is indicated by 1, the downward-inclined slide surface following the circular cutter 1 is indicated by 2, and the complete cassette fitted after the slide surface 2 is indicated by 3.

The cassette has been divided by means of partitition walls 4 into compartments 5, the length of which correspond to the length of the cut strips and the width of which is determined by the width of the strips. The upper edge of the partitions 4 is above the plane which is a continuation of the slide surface 2, the partitions 4 continue on the slide surface 2 as longitudinal, vertical guide walls 6, the upper end of which is beveled and meets the upper edge 7 of the slide surface 2.

The circular cutter 1 has two shafts 8 and 9, fitted horizontally one above the other. Circular blades 10 have been mounted on each shaft at regular distances from each other in the axial direction so that the blades 10 on the upper shaft 8 slightly overlap the respective opposite blades 10 on the lower shaft 9. The shafts 8 and 9 have been fitted to rotate in opposite directions in order to cut the blank sheet fed between the blades 10 on the two shafts 8 and 9 into parallel adjacent strips and in order to feed the strips onto the inclined slide surface 2 between the guide walls 6.

Upon leaving the circular cutter 1 each cut strip falls onto a lateral-transfer tray, these trays extending in the longitudinal direction from the circular cutter 1 to approximately halfway down the inclined slide surface 2, and in the lateral direction each lateral-transfer tray 11 extends from the intersection between a guide wall 6 and the slide surface 2, in an upward-slanting direction, over the upper edge of the adjacent guide wall 6 and partly above the next interval between guide walls. Since the upper ends of the guide walls 6 are beveled, the inclination of the lateral-transfer trays 11 increase gradually towards their trailing edge 12.

The purpose of the lateral-transfer trays is, on the one hand, to keep the edges of adjacent strips apart so that the strips will not cling to each other, and on the other hand, to transfer the strips in the lateral direction so that each strip is directed to its respective interval between the guide walls and onwards into the compartment 5, one on top of the other. The strips thus gravitate away from each other and at the same time forwards each into its respective compartment 5 in the cassette 3. This lateral transfer is necessary even for the reason that, owing to the space taken by the thickness of the partitions, the spacing of the compartments 5 in the cassette 3 is wider than that of the blades 10 of the circular cutter 1. Thus the lateral-transfer trays 11 must be fitted so that they overlap slightly in the lateral direction, with the overlap increasing in the lateral direction (in the figure, on the left-hand side).

After the cutting the uneven edge strips fall over the external guide walls on the slide surface 2 to the opposite sides of the slide surface. For one of the edge strips there is an upward-directed plate 15 extending laterally from the respective external guide wall towards the slide surface 2, and the edge strips coming on it slide along it to the side.

Figure 2:
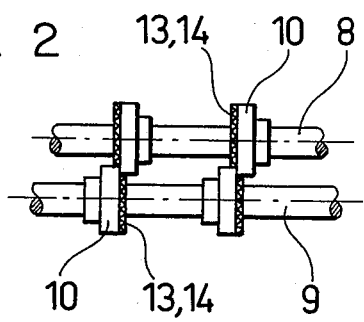
FIG. 2 is a detail view showing part of the shafts and blades employed in the apparatus of FIG. 1.

For feeding the blank sheet and guiding the strips, there is, as shown in the detail view of FIG. 2, a smaller-diameter peripheral surface 13 on the side of each circular blade 10 on the upper shaft 8; together with an opposite circular blade at the corresponding point on the lower shaft 9 this surface 13 constitutes a point which presses the plate. Furthermore, the peripheral surface 13 of each circular blade 10 is coated with a resilient material 14 to produce a pressure contact for the sheet without damaging the sheet.

The inclination of the lateral-transfer trays 11 and the slide surface 2 is selected so that, under the effect of the momentum given to the strips by the circular cutter and gravity, the cut strips slide and fall automatically into the cassette 3. The feeding rate must, of course, be adjusted to allow for the cut strips to pass before the next strips enter on the slide surface 2.

Furthermore, the end 16 of the cassette 3 can be opened so that the stacks of strips in the compartments 5 can be removed from the cassette 3 and transferred to the starting-sheet machine for bending the strips and for attaching them to the starting sheets. Alternatively, the entire cassette can be transferred to the starting-sheet machine.

What is claimed is:

1. An apparatus for cutting a blank sheet into strips and for stacking these strips in adjoining compartments separated by partition walls, the apparatus comprising: a frame, at least two superimposed shafts mounted in the frame for rotation in opposite directions; slightly overlapping circular blades mounted in spaced relationship from each other in the axial direction on the shafts, in order to cut the blank sheet fed therebetween and to feed the cut strips in the direction of the feed downward; an inclined slide surface mounted in the frame for receiving the cut strips and having substantially on the same vertical longitudinal plane as the partition walls of the adjoining compartments, guide walls for receiving the cut strips and for guiding each of them into its respective compartment; lateral-transfer trays mounted on the inclined slide surface and extending, as seen in the direction of the feed, slightly forward and downward from the circular blades, being also inclined in the lateral direction and extending in the lateral direction from between two adjacent guide walls over one guide wall, at maximum as far as the vertical longitudinal plane running through a cutting point of one edge of the strip entering the lateral-transfer tray and at minimum through the vertical longitudinal plane which passes through a center point between the cutting points of the cut strip, in order to slant the cut strips and to cause that edge which is inclined lower to slide along the adjacent guide wall, so that the upper edge will fall between the guide walls before the strip falls into the compartment.

2. The apparatus of claim 1, in which that edge of the lateral-transfer tray which is lower meets the adjacent guide wall.

3. The apparatus of claim 1, in which the lateral-transfer trays are inclined laterally in such a manner that that edge of the strip which is forced downward by the circular blade on the upper shaft when the strip is being cut slides sideward on the lateral-transfer tray, before the opposite edge of the strip, and impinges against the adjacent guide wall.

4. The apparatus of claim 1, in which the length of that part of the guide walls which follows the lateral-transfer trays is at least equal to the length of the strips to be cut.

5. The apparatus of claim 1, in which the length of the lateral-transfer trays is at least equal to the length of the strips to be cut.

6. The apparatus of claim 1, in which the guide walls form an uninterrupted, even wall with the respective partitions between the compartments.

7. The apparatus of claim 1, in which on the side of the circular blade there is a smaller-diameter peripheral surface, which operates in conjunction with the peripheral surface of the circular blade opposite on the other shaft in order to form a point of pressure between the said peripheral surfaces, to grip and feed the blank sheet to be cut and to guide the cut strip.

8. The apparatus of claim 7, in which the peripheral surfaces have been coated with a resilient material in order to produce pressure without damaging the strip.

9. The apparatus of claim 1, in which the upper ends of the guide walls are beveled and meet the inclined slide surface.

10. The apparatus of claim 2, in which the edge of the lateral-transfer tray which is lower also meets the inclined surface.

* * * * *